(12) United States Patent
Royer (10) Patent No.: US 7,679,509 B2
(45) Date of Patent: Mar. 16, 2010

(54) SYSTEM AND METHOD FOR IMPROVING INFRARED DETECTOR PERFORMANCE IN DUAL DETECTOR SYSTEM

(75) Inventor: Gregory Royer, Walworth, NY (US)

(73) Assignee: Robert Bosch GmbH, Stuttgart (DE)

( * ) Notice: Subject to any disclaimer, the term of this patent is extended or adjusted under 35 U.S.C. 154(b) by 331 days.

(21) Appl. No.: 11/714,934

(22) Filed: Mar. 7, 2007

(65) Prior Publication Data

US 2008/0218340 A1    Sep. 11, 2008

(51) Int. Cl.
*G08B 13/18* (2006.01)

(52) U.S. Cl. ............... 340/567; 340/522; 340/554; 340/506; 340/565; 340/540; 340/541; 342/28; 342/106; 342/107

(58) Field of Classification Search ........... 340/567, 340/522, 506, 565, 540, 541, 554; 342/28, 342/106, 107
See application file for complete search history.

(56) References Cited

U.S. PATENT DOCUMENTS

| | | | |
|---|---|---|---|
| RE34,501 E | 1/1994 | Jean et al. | |
| 5,276,427 A | 1/1994 | Peterson | |
| 5,331,308 A | 7/1994 | Buccola et al. | |
| 5,453,733 A | 9/1995 | Peterson et al. | |
| 5,475,365 A | 12/1995 | Hoseit et al. | |
| 5,578,988 A | 11/1996 | Hoseit et al. | |
| 5,581,237 A | 12/1996 | DiPoala | |
| 5,631,639 A | 5/1997 | Hibino et al. | |
| 5,751,211 A | 5/1998 | Shirai et al. | |
| 5,754,099 A | 5/1998 | Nishimura et al. | |
| 6,018,308 A | 1/2000 | Shirai | |
| 6,127,926 A | 10/2000 | Dando | |
| 6,191,688 B1 | 2/2001 | Sprouse | |
| 6,239,736 B1 | 5/2001 | McDonald et al. | |
| 6,351,234 B1 | 2/2002 | Choy | |
| 6,380,882 B1* | 4/2002 | Hegnauer | ............ 342/28 |
| 6,720,874 B2 | 4/2004 | Fufido et al. | |
| 2003/0052811 A1* | 3/2003 | Lawless | ............ 342/28 |
| 2004/0140892 A1 | 7/2004 | Hanood | |

(Continued)

FOREIGN PATENT DOCUMENTS

EP    1 873 553 A    1/2008

(Continued)

OTHER PUBLICATIONS

Search and Examination Report for corresponding European Application No. 08400010.8 issued by the European Patent Office on May 29, 2008.

*Primary Examiner*—Tai T Nguyen
(74) *Attorney, Agent, or Firm*—Baker & Daniels LLP (57) ABSTRACT

Embodiments of the present invention is directed to a method and system for use of ranging MW to reduce dual (MW/PIR) intrusion detector false alarms. A Doppler microwave system may be provided that is capable of detecting an object range and adjusting the sensitivity of the PIR detector to account for object size and range. Multiple range limited MW stages may be configured for different ranges to determine the general range of the moving object. Based on signal levels present on these MW stages, an approximate object range is determined. The sensitivity of the PIR is then adjusted based on a PIR sensitivity vs. object range function that is optimized to alarm on humans and ignore small animals and insects.

30 Claims, 8 Drawing Sheets

U.S. PATENT DOCUMENTS

| | | |
|---|---|---|
| 2004/0160324 A1 | 8/2004 | Stilp |
| 2005/0024208 A1 | 2/2005 | Maki et al. |
| 2005/0128067 A1 | 6/2005 | Zakrewski |
| 2005/0134450 A1 | 6/2005 | Kovach |
| 2007/0176765 A1* | 8/2007 | Babich et al. ............... 340/522 |
| 2008/0029703 A1* | 2/2008 | DiPoala ..................... 250/342 |

FOREIGN PATENT DOCUMENTS

| | | |
|---|---|---|
| GB | 2 311 158 A | 9/1997 |
| GB | 2 441 285 A | 2/2008 |
| JP | 2004157102 | 6/2004 |
| WO | WO 98/34206 A | 8/1998 |
| WO | WO 99/27335 | 6/1999 |
| WO | WO 2006/082405 A | 8/2006 |
| WO | WO 2006/109771 A | 10/2006 |
| WO | WO 2006/137477 A | 12/2006 |
| WO | WO 2007/089413 A2 | 8/2007 |

* cited by examiner

| Detector Range | Insect Bin | | Short Range Bin | | Mid Range Bin | | Long Range Bin | |
|---|---|---|---|---|---|---|---|---|
| | Range | Tinsect | Range | Tshort | Range | Tmid | Range | Tlong |
| 30ft | 3ft | 20nS | 13ft | 40nS | 26ft | 70nS | 30ft | 90nS |
| 40ft | 3ft | 20nS | 13ft | 40nS | 26ft | 70nS | 40ft | 105nS |
| 50ft | 3ft | 20nS | 13ft | 40nS | 36ft | 95nS | 50ft | 130nS |
| 60ft | 3ft | 20nS | 13ft | 40nS | 36ft | 95nS | 60ft | 155nS |

| Detector Range 610 | Target Range 620 | PIR Thresh 630 | Target Range 640 | PIR Thresh 650 | Target Range 660 | PIR Thresh 670 | Target Range 680 | PIR Thresh 690 |
|---|---|---|---|---|---|---|---|---|
| 30ft | Less than 3ft | 1.5v | 3 to 13ft | 0.5v | 13 to 26ft | 0.7v | 26 to 30ft | 0.7v |
| 40ft | Less than 3ft | 1.5v | 3 to 13ft | 0.5v | 13 to 26ft | 0.7v | 26 to 40ft | 0.5v |
| 50ft | Less than 3ft | 1.5v | 3 to 13ft | 0.5v | 13 to 36ft | 0.7v | 36 to 50ft | 0.5v |
| 60ft | Less than 3ft | 1.5v | 3 to 13ft | 0.5v | 13 to 36ft | 0.7v | 36 to 60ft | 0.5v |

SYSTEM AND METHOD FOR IMPROVING INFRARED DETECTOR PERFORMANCE IN DUAL DETECTOR SYSTEM

TECHNICAL FIELD

Embodiments of the present invention relate to motion detectors. More particularly, embodiments of the invention are directed to reducing the occurrence of false alarms and improving the performance of infrared detectors in dual detector systems.

BACKGROUND OF THE INVENTION

Currently, in the field of security systems, motion detectors are generally provided to detect intruders. Dual technology motion detectors incorporate multiple sensing technologies in order to provide efficient intruder detection with minimized risk of false alarms. Many dual detectors incorporate passive infrared (PIR) technology and microwave (MW) technology.

PIR technology has long been used in motion detectors. The PIR sensor detects the difference between the infrared energy emitted from an intruder and that emitted from the ambient environment. Many PIR detectors utilize Fresnel lenses or custom shaped mirrors to focus infrared energy on a pyrodetector. The output signal from the pyrodetector is then processed via analog hardware and/or digital signal processing. Lenses and mirrors are designed to provide various detection zones emanating radially from the sensor. As a target moves across the PIR detection zones, the sensing elements within the pyrodetector are alternately exposed to the target IF energy, resulting in an alternating voltage output from the PIR sensor. The amplitude and frequency of this voltage vary with a number of factors including target size, speed, and direction relative to the PIR zones, difference between ambient and target temperature, width and spacing between the detection zones, and frequency response of the pyrodetector.

Upon receiving the signals, the detector may perform processing by comparing the received signal to one or more voltage thresholds. These threshold crossings produce positive and negative pulses that can be counted and timed, with certain combinations of pulse height, duration, and frequency being considered PIR alarms.

MW technology often operates on the principle of phase shift or Doppler effect. Unlike PIR, MW technology is an active technology. The MW detector transmits MW energy, which reflects off objects and returns to the MW detector. Moving objects result in a received signal that is frequency shifted from the original transmitted signal. The detector receives this signal, and generates an alternating voltage difference frequency signal which is then processed via hardware or digital signal processing. Because only the AC (alternating current) component of the signal is processed, only moving objects are detected. The frequency of the returned signal is dependent upon the target movement direction and speed. The amplitude is a function of transmitted signal strength, target size, distance, and reflectivity. Highly reflective materials such as metal will return significantly greater energy to the detector than less reflective objects such as people or animals. Processing may include comparison of the MW signal to one or more thresholds with certain combinations of quantity, duration, or frequency of threshold crossings considered MW alarms.

Typically, dual technology detectors incorporate an AND function, whereby both individual sensor technologies must be in the alarm state simultaneously to produce an alarm at the detector output. PIR and MW technologies have many differing and distinct potential false alarm sources, as well as some common sources such as small animals. Minimization of false alarms from either detector is likely to greatly reduce the incidence of false alarms for the dual detector system.

PIR motion detectors are susceptible to false alarms caused by small animals close to the detector. A small animal near the detector may provide similar infrared energy levels to the PIR sensor as a human at greater distances. In cold environments, the greater differential between small animal infrared emissions and that of the background can exacerbate this problem. Insects crawling on a detector cover or flying very near the detector also pose a threat in cases where the background includes any kind of stationary object with a temperature different from the ambient temperature, such as a heat source.

Some currently existing systems, such as that of U.S. Pat. No. 5,578,988 minimize PIR false alarms. This system includes a thermistor, which detects ambient temperature in order to adjust a PIR alarm threshold if necessary. However, this system does not consider a distance of the target object from the PIR detector. A solution is needed that minimizes PIR false alarm effects by considering target location in order to improve dual detector accuracy.

BRIEF SUMMARY OF THE INVENTION

In one aspect, a method for minimizing false alarms due to small animals and insects in a coverage area of a dual detector system is provided. The dual detector system includes at least one MW sensor and at least one PIR sensor. The method may include determining a target range for a detected target based on received MW signals. The method may additionally include adjusting a PIR sensor threshold based on the determined target range. The PIR sensor threshold is adjusted to a first level when the detected target is a short range target and second level when the target is a longer range target, such that the first level is higher than the second level. If for any reason, PIR sensitivity is reduced at close range, perhaps due to multiple PIR signals with different circuit gains, or due to mirror or lens performance, the first level may be lower than the second level. In addition to PIR sensor threshold, PIR sensitivity may be adjusted by changing the duration, quantity, or frequency of pulses required to cause an alarm. Other configurations involving more than two alarm sensitivities are also within the scope of the invention.

In another aspect of the invention, a method is provided for improving false alarm immunity for a dual intrusion detector, the dual intrusion detector including at least one MW sensor and at least one PIR sensor. The method may include classifying a received MW signal into a range bin and estimating a target range based on a range bin state comparison. The method may additionally include determining an optimal PIR sensor sensitivity based on the estimated target range.

In yet a further aspect of the invention, a system may be provided for improving false alarm immunity for a dual intrusion detector. The dual intrusion detector includes at least one MW sensor and at least one PIR sensor. The system may include multiple range bins for classifying MW signals. The system may additionally include a range determination module for estimating a target range based on a state of each of the multiple range bins and an infrared sensitivity determination mechanism for determining an optimal PIR sensor sensitivity level based on the estimated target range.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a system and method for adjusting PIR sensitivity in order to minimize false alarms in a dual detector system. Potential false alarm sources to be addressed include small animals and insects, especially those near the detector. IR energy from small animals at close range may be comparable to IR energy emitted by humans at greater distances. Insects crawling on the detector cover may also be a source of false alarms if a heat source exists in the background. While the insect is cold blooded, having a body temperature equal to the ambient temperature, its body can shield the PIR sensor from a background heat source. Embodiments of the invention are also directed to correcting detection limitations that are often present in dual detectors. For instance, intruders crawling beneath or in the near vicinity of the detector may produce low level signals, particularly if the detector is mounted high on a wall, or lenses or mirrors are optimized for more distant targets. Additionally, slow moving targets at great distances tend to produce very low frequency signals that may be small in amplitude due to circuit bandwidths and may make detection of these targets very difficult without greatly increasing the sensitivity of the entire system, thereby risking additional false alarms.

Embodiments of the invention use both a Doppler MW system capable of detecting objects in various object ranges and a PIR detector. For instance, multiple overlapping and progressively longer ranges from zero to up to 3 feet, 13 feet, 36 feet, and 60 feet could be provided. Multiple range limited MW stages are configured for different ranges to determine the general or approximate range of a moving object. For instance, the four MW stages could determine that a moving object is in the range of 36 to 60 feet. That information is then used to adjust the sensitivity of the PIR sensor. The approximate strength that a human generates on the PIR detector in the range of 36 to 60 feet is known. The PIR detector sensitivity may be adjusted to optimize its sensitivity to cause an alarm only for human beings located in the distance range of 36 to 60 feet and ignore small animals and insects in the distance range of 36 to 60 feet. PIR sensitivity adjustments may include the adjustment of pulse threshold, duration, quantity, or frequency required for alarm.

Figure 1:
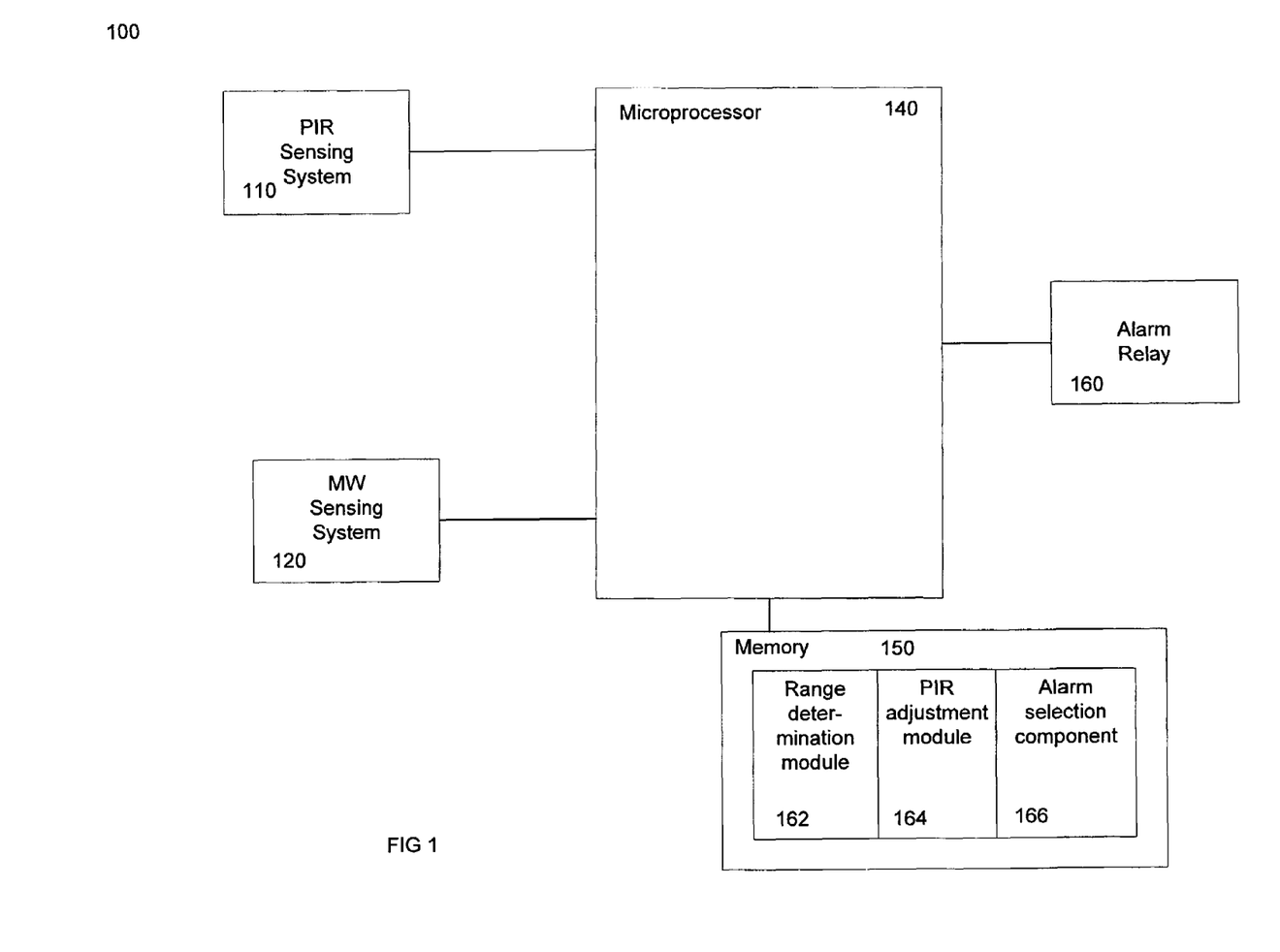
FIG. 1 is a block diagram illustrating an intrusion detection system in accordance with an embodiment of the invention.

FIG. 1 is a block diagram illustrating a dual detector system 100. A PIR sensing system 110 and a MW sensing system 120 may be connected with a microprocessor 140. The microprocessor 140 may be connected with a memory 150 having modules serving multiple functions. The memory 150 may include a range determination module 162, a PIR adjustment module 164, and an alarm selection component 166. The microprocessor 140 may also be connected with an alarm relay 160 for triggering an intrusion alarm.

The PIR sensing system 110 may operate in a conventional manner by utilizing lenses or mirrors to focus infrared energy on a pyrodetector. The output signal from the pyrodetector is then processed via analog hardware and/or digital signal processing.

The MW sensing system 120, embodiments of which are further described below with reference to FIG. 2 may include a transceiver having transmitting and receiving antennas. The transmitting antenna transmits microwave energy generally into microwave detection space. As the microwave signals impinge on an object in MW space, at least some of the MW signals are reflected toward the receiving antenna. Depending on the characteristics of the reflected signal, the detector may generate a voltage signal that indicates the presence of a moving object.

The microprocessor 140 may include any type of microprocessor, such as a microcontroller having integral memory chips. The modules 162, 164, and 166 may be or include memory chips integral with a microcontroller. In some instances, the functions of modules 162, 164, and 166 may be accomplished partially or entirely with hardware. As shown, the microprocessor 140 also may be connected with the discrete memory 150.

The memory 150 may include computer storage media in the form of volatile and/or nonvolatile memory such as read only memory (ROM) and random access memory (RAM). A basic input/output system (BIOS), containing the basic routines that help to transfer information between elements within the security system environment 100, such as during start-up, may be stored in ROM. RAM typically contains data and/or program modules that are immediately accessible to and/or presently being operated on by microprocessor 140.

The RAM may include an operating system, program data, and application program. The application programs may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including multiprocessor systems, microprocessor-based or programmable consumer electronics, minicomputers, mainframe computers, and the like.

Regardless of its type, the memory 150 may include firmware, hardware, or software modules that perform the function specified by the range determination module 162, the PIR adjustment module 164, and the alarm selection component 166.

The alarm relay 160 may be operable to trigger an alarm upon detecting a security violation. The alarm system may activate any appropriate type of visible or audible alarm including both remote and proximal alarms. As set forth above, typically, both the MW sensing system 120 and the PIR sensing system 110 must exhibit alarm conditions in order for an alarm to be triggered.

Figure 2:
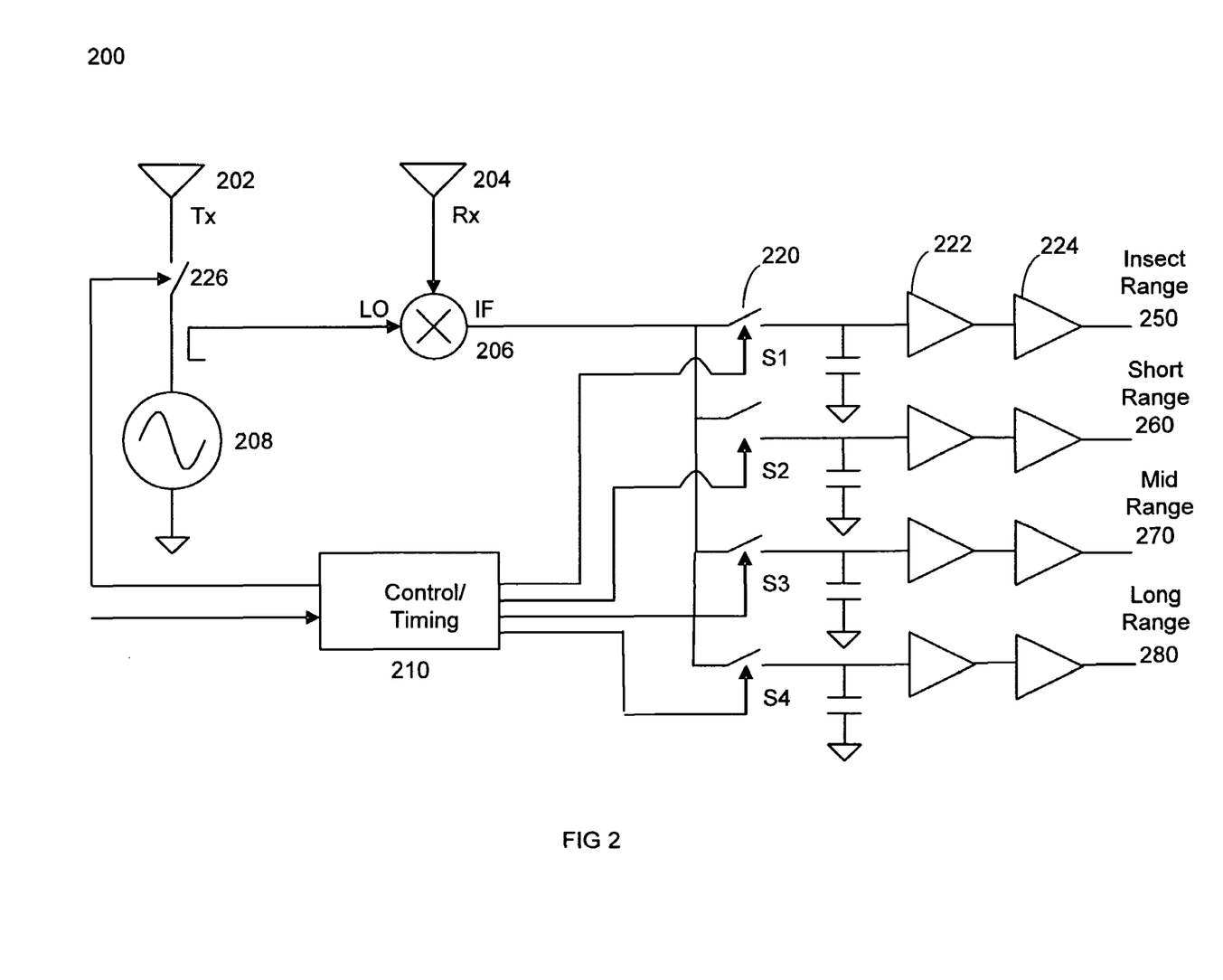
FIG. 2 is a block diagram illustrating a ranging MW detection system in accordance with an embodiment of the invention.

FIG. 2 illustrates a microwave sensing system 200 in accordance with an embodiment of the invention. The system 200 is preferably a Doppler based system that detects moving objects. The MW sensing system may include a transmitter including an oscillator 208, a switch 226, and a transmitting antenna 202. A receiver antenna 204 receives signals returned from a moving target and delivers the signals to a mixer 206. The mixer 206 produces IF output that may include a low frequency signal. The IF output may, for example, include a signal of frequency approximately equal to 31 Hz/mph of target radial velocity, which is the component of the target velocity vector directed toward or away from the microwave sensing system 200.

The embodiment illustrated in FIG. 2 includes four range bins 250, 260, 270, and 280. However, alternative embodiments may include as few as two bins and an unlimited number of additional bins depending upon the total target detection area. Each range bin covers a specified area beyond the detector. An insect range bin 250, a short range bin 260, a mid range bin 270, and a long range bin 280 are illustrated in FIG. 2.

Each bin 250, 260, 270, and 280 may include a sample/hold circuit and two stages of gain and filtering as illustrated by 220, 222, and 224. Each range bin second gain stage output may be applied to an A/D converter. If necessary, it may also be possible to apply the range bin first gain stages to A/D inputs. This could prove useful for signal amplitude measurement in cases when the second gain stage output(s) saturate. It would then be necessary to determine the optimal distribution of total gain between the first and second stages of each bin. Appropriate gain and filter parameters may be adjusted for a particular detector application.

In an embodiment of the invention, the insect range bin 250 detects targets in a range from zero to three feet of the detector. The insect range bin 250 may detect insects crawling on the detector or flying very near the detector. A function of the insect range bin 250 is to aid in insect immunity in order to minimize false alarms.

The short range bin 260, in accordance with an embodiment of the invention, is designed to detect targets in a range of zero to thirteen feet from the detector. The short range bin may serve to detect crawling intruders under or near the detector and also to distinguish small animals from human intruders as will be further explained below.

The mid-range bin 270 may detect targets from zero to twenty six or thirty six feet from the detector. The mid-range coverage may vary with detector range setting. The mid-range bin may also serve to distinguish small animals from human intruders.

The long range bin 280 may have a coverage dependent upon the detector range as the long range bin may cover a range from the zero to the maximum detector coverage range. For instance, the long range bin 280 may detect targets from zero to thirty, forty, fifty, or sixty feet from the detector. Ideally, in embodiments of the invention, the MW detector system 200 will enter an alarm state when an intruder enters anywhere within the range of this bin.

In operation, the transmitter 202 is gated on and the IF signal is sampled for a fixed sample time afterward. This fixed sample time is determined by the free space propagation speed of the MW energy or 1 ft/ns. For example, it takes 40 ns for energy to reach a target at a range of 20 ft, and return to the sensor. In reality, there are other considerations that influence range and optimal sample timing as well, such as MW transmit and receive antenna pattern shapes, and transmitter 202 time response.

Figure 3:
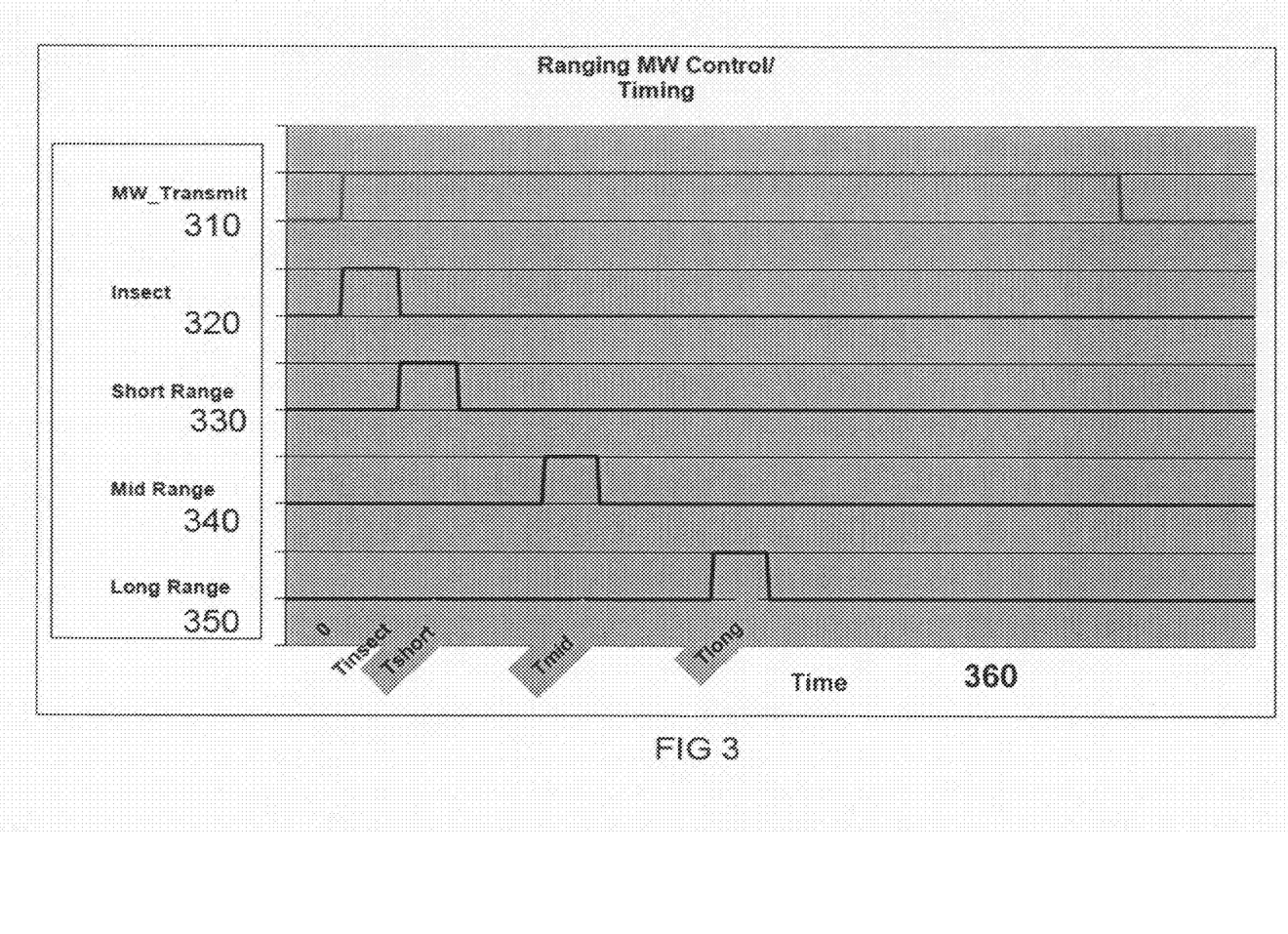
FIG. 3 is a timing diagram illustrating signal timing for the multiple range bins in accordance with an embodiment of the invention.

FIG. 3 is a timing diagram 300 illustrating a transmission pulse 310, and sample pulses 320, 330, 340, and 350 along the y-axis for each provided bin. The x-axis 360 represents time. Due to regulatory bandwidth requirements, as illustrated in FIG. 3, it is necessary for the MW transmissions to be very long relative to the sampling delays of the system. As a result, the MW transmitter continues to transmit during the sample periods, and long afterward, as shown by a transmission pulse 310 in the timing diagram 300. This has the result that a given sample will detect moving targets within the entire area bounded by the sensor and a maximum range determined by the conclusion of the sample pulse.

For example, referring to the mid range bin pulse 340 on the timing diagram 300, the delay between the beginning of MW transmission (MW_Transmit rising edge) and the end of the mid range sample pulse 340 is approximately 40 ns. Thus, theoretically the mid-range sample will detect moving targets in the range of zero feet to twenty feet from the detection system.

The start of MW transmission may be followed by one precisely placed returned signal sample for each range bin. Each range bin detects targets between the sensor and a maximum range defined by the time between the start of transmission and the end of its associated sample pulse. FIG. 3 shows the timing of the MW transmit signal and the four range bin samples. The effective range of each bin is determined by the time difference between the start of MW Transmit and the end of the appropriate sample pulse. The placement of the sample pulses, and therefore the range of each bin, can be placed under control of user selectable switches or a microprocessor, allowing user configuration of the detector range.

The ranging MW system uses precisely timed MW transmissions and returned signal samples to limit the effective detection range of the technology. Knowing the time (t) required for the transmitted energy to travel to a target at a given distance $d_{max}$ and return to the detector also (t), it is possible to limit the range to the distance $d_{max}$ by limiting the sampling of returned energy to that received before 2×t. This requires that transmission begin at a precisely known time and that returned signal samples occur at a very precise time afterward. This results in the MW ranging system detecting targets within distance $d_{max}$ and not detecting targets beyond $d_{max}$. As set forth above, sampling the returned signal at multiple intervals creates the multiple range detection bins. One precisely placed sample pulse corresponds to each range bin and the time delay between MW transmission start and end of each sample determines the maximum range of a bin.

Figure 4:
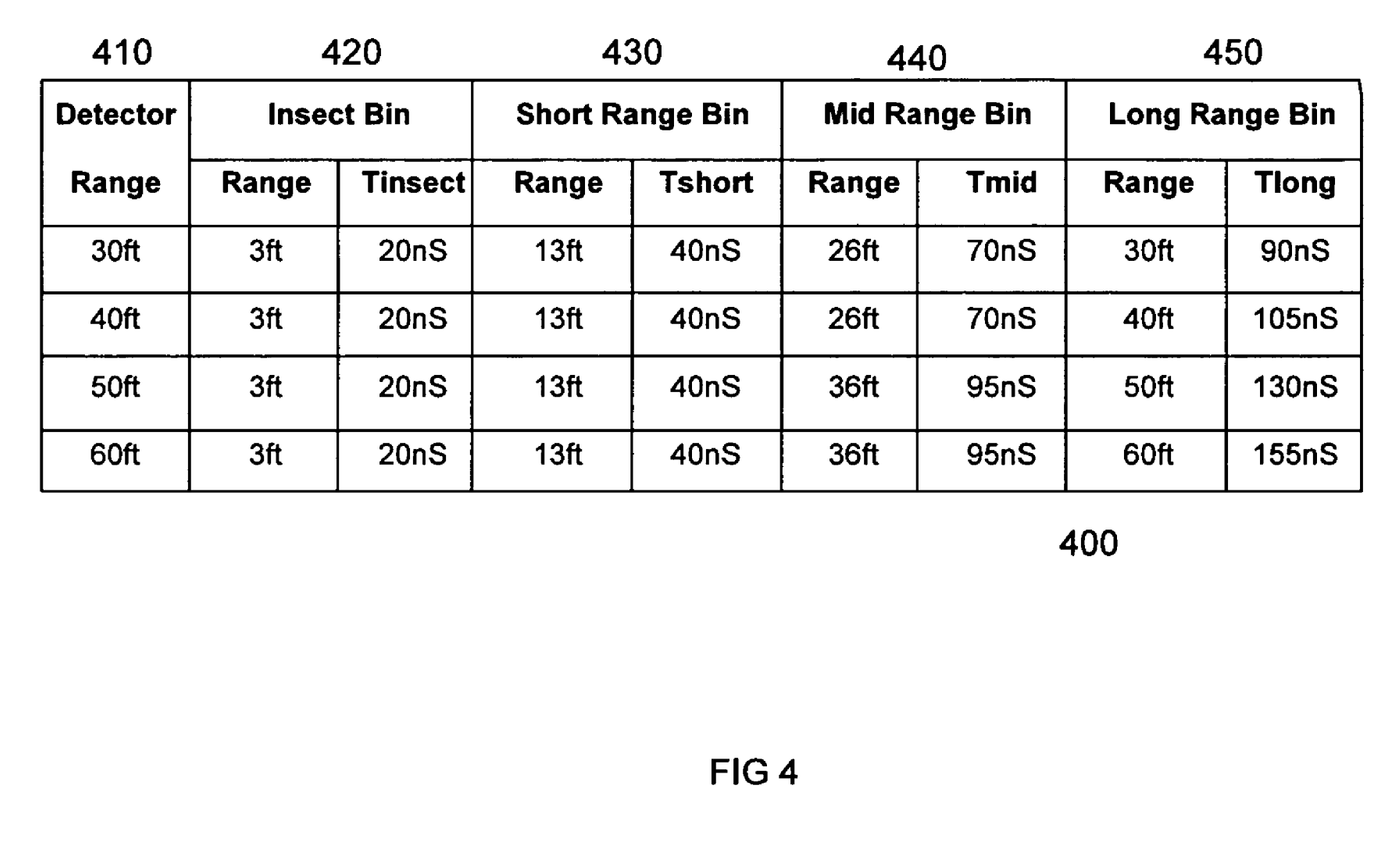
FIG. 4 is a table illustrating approximate range bin configurations in accordance with an embodiment of the invention.

FIG. 4 is a table 400 illustrating approximate range bin configurations for each detector range configuration in accordance with an embodiment of the invention. Column 410 illustrates four detector ranges in accordance with four embodiments of the invention. For each detector range 410, the four provided bins 420, 430, 440, and 450 have a pre-selected bin range and a signal sample time as illustrated under each bin. For the insect bin 420, the pre-selected bin range is three feet and the signal sample time is 20 ns for each of the detector ranges. For the short range bin 430, the pre-selected bin range is thirteen feet and the signal sample time is 40 ns for each of the detector ranges. For the mid-range bin 440, the pre-selected bin range is twenty six feet and the signal sample time is 70 ns for detector ranges of thirty and forty feet. For detector ranges of fifty and sixty feet, the pre-selected bin range is thirty six feet and the signal sample time is 95 ns. For the long range bin 450, the pre-selected bin range is thirty feet and the signal sample time is 90 ns for a detector range setting of thirty feet. For a detector range setting of forty feet, the pre-selected bin range is forty feet and the signal sample time is 105 ns. For a detector range of fifty feet, the pre-selected bin range is fifty feet and the signal sample time is 130 ns. For a detector setting of sixty feet, the pre-selected bin range is sixty feet and the signal sample time is 155 ns.

Figure 5:
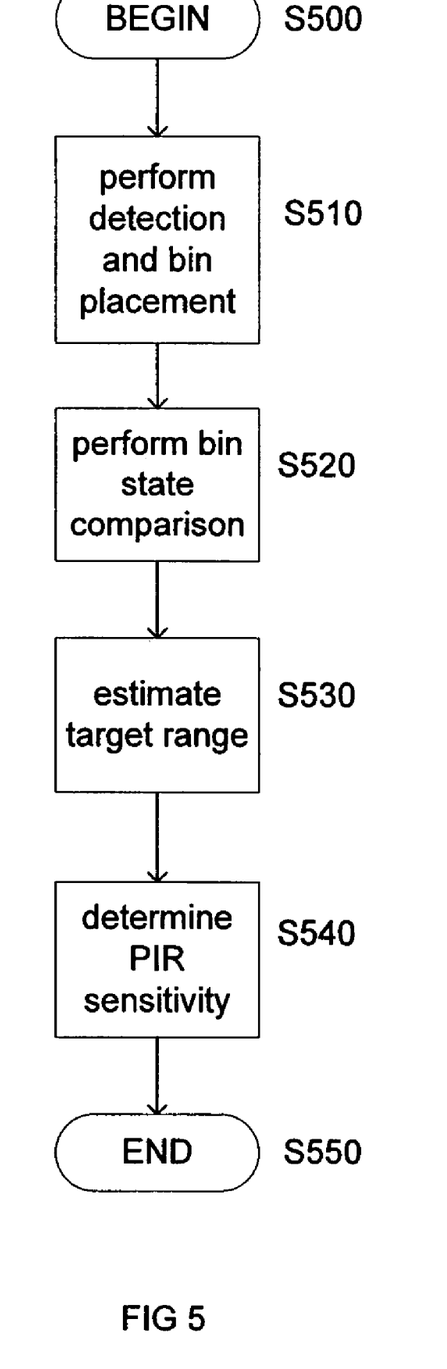
FIG. 5 is a flow chart illustrating a false alarm minimization technique in accordance with an embodiment of the invention.

FIG. 5 illustrates a method for adjusting PIR sensitivity in accordance with an embodiment of the invention. The process begins in S500 and in S510 the system performs microwave detection and makes bin placements. In S520, the system performs a bin state comparison. In S530, based on the bin state comparison, the system estimates a range of the target. After estimating the range of the target in S530, the system determines an optimal PIR sensitivity in S440 and the process ends in S550.

The MW detection and bin placement of S510 may be accomplished as set forth above. The insect, short, and mid range bins of the MW detection system aid in determining an approximate range of the target. The long range bin detects all objects within the detector coverage pattern. Each range bin detects targets located between the detector and its maximum bin range. It is possible to determine the general range of a target by comparing the states of the range bins. A moving target will be detected by each range bin with a maximum bin range greater than the target range. Accordingly, the estimation of target range of S530 can be determined to be between the maximum range of the longest range bin for which there is no detection and the maximum range of the shortest range bin for which there is detection.

For instance, using the detector parameters of FIG. 4, a target twenty three feet from the detector will generate a signal that will reach both the mid-range bin and the long range bin in S510. The bin state comparison of S520 sorts out which bins have detected a specified target. The signal would not be detected by the insect range bin or the short range bin. Accordingly, target range determination module can ascertain in S530 that the target range is between thirteen feet (short range bin maximum range) and thirty six feet (mid-range bin maximum range) for detector ranges of fifty or sixty feet, or between thirteen feet (short range bin maximum range) and twenty six feet (mid range bin maximum range) for detector ranges of thirty or forty feet. In general, the algorithms of the range detection module operate on the principle that the insect, short range, mid-range, and long range bin detection (and therefore the target range) determine the alarm characteristics that are compared against the PIR signal.

Step 540 of FIG. 5 requires the determination of optimal PIR sensitivity. This determination is made by the PIR adjustment module 164 of FIG. 1. This determination is largely based on the problems to be solved by PIR adjustment. These problems include false alarms activated by insects and small animals as well as the failure to provide an alarm in the cases of slow moving targets at long range and intruders crawling close to the detector.

Problems with false alarms can occur if a small animal moving at appropriate speeds crosses the detection pattern at relatively close range. In many commercial settings, rats or birds are common and may be sources of false alarm potential. A small animal at short or mid range may present the same amount of sensor received infrared or MW power as a human intruder at a longer range. A simple PIR or Doppler MW has no means of distinguishing between two such signals, but the presently disclosed ranging system identifies the target as being close to the detector since its MW signal will be received in the short range and/or mid range bin.

Generally, in the case of a PIR detector, a small animal near the detector may produce a signal large enough to cause a PIR alarm since the PIR alarm requirements must be sufficiently non-restrictive to provide reliable intruder detection at maximum range under adverse conditions. However, given knowledge of target range, in order to minimize false PIR alarms when small animals enter the coverage range, it is desirable to adjust the PIR sensitivity based upon the target range.

In the case of insects, the system aims to prevent alarms when insects fly very close to the sensor or crawl on the sensor. Insects crawling on, or flying near the sensor may produce infrared energy returns comparable to human intruders at long range even though they are cold blooded and therefore near ambient temperature, if there is a heat source in the background. In this case, the cooler insect appears to move across a warmer background. In order to minimize the chances of the PIR technology detecting insects near the detector, the PIR technology is disabled or greatly reduced in sensitivity when the insect range bin detects a target. The reduction in sensitivity can be accomplished by requiring larger amplitude or a greater quantity or frequency of pulses to be required for consideration as a PIR alarm.

In additional embodiments of the invention, the PIR signal may be ignored from the time the MW insect range bin detects a target until a specified time delay after the MW insect range bin clears. The time delay allows for PIR amplifier recovery.

Intruders crawling beneath a detector often produce a smaller PIR amplitude signal and fewer signal pulses than a target farther away from the detector. This is largely dependent on optical design. In order to improve sensitivity to intruders crawling beneath the detector, it is desirable to increase the detector PIR sensitivity in this area without greatly reducing small animal immunity farther away from the detector. This can be accomplished using either of the two methods below or a combination of them.

When a target is recognized as being within the short range bin range but not within the insect range bin range (three to thirteen feet in range bin configuration), the PIR adjustment module may enable a more sensitive PIR detection mode that requires a lower pulse threshold, fewer pulses or lower pulse frequency to be recognized as a PIR alarm. For example, the PIR adjustment module might adjust the PIR threshold in the three to thirteen feet target range from one volt to one-half volt.

Slow moving intruders at distances near maximum detector range may produce very low frequency PIR signals that are often filtered out in hardware or otherwise discounted, as they may be similar to PIR signals caused by drafts from sources such as heat vents or air conditioning vents located near the detector. These low frequency signals are a result of the width of the detection zones and inter-zone spacings, which tend to be wider near the detector maximum range. In order to improve sensitivity to slow moving intruders it is desirable to allow low frequency signals to cause PIR alarms when the target range is sufficiently distant from the detector.

In order to implement a solution, hardware signal processing bandwidth must be sufficiently wide to allow the low frequency signals to pass through to the digital conversion stage. Typically the low frequency signals would be discounted by requiring a sufficiently high pulse quantity, frequency, or amplitude to occur for alarm detection, thereby effectively filtering out draft related signals. However, if the target was determined to be sufficiently distant, for example greater than thirty six feet for detector range configurations of fifty feet and sixty feet, such low frequency PIR signals would qualify as PIR alarms.

Figure 6:
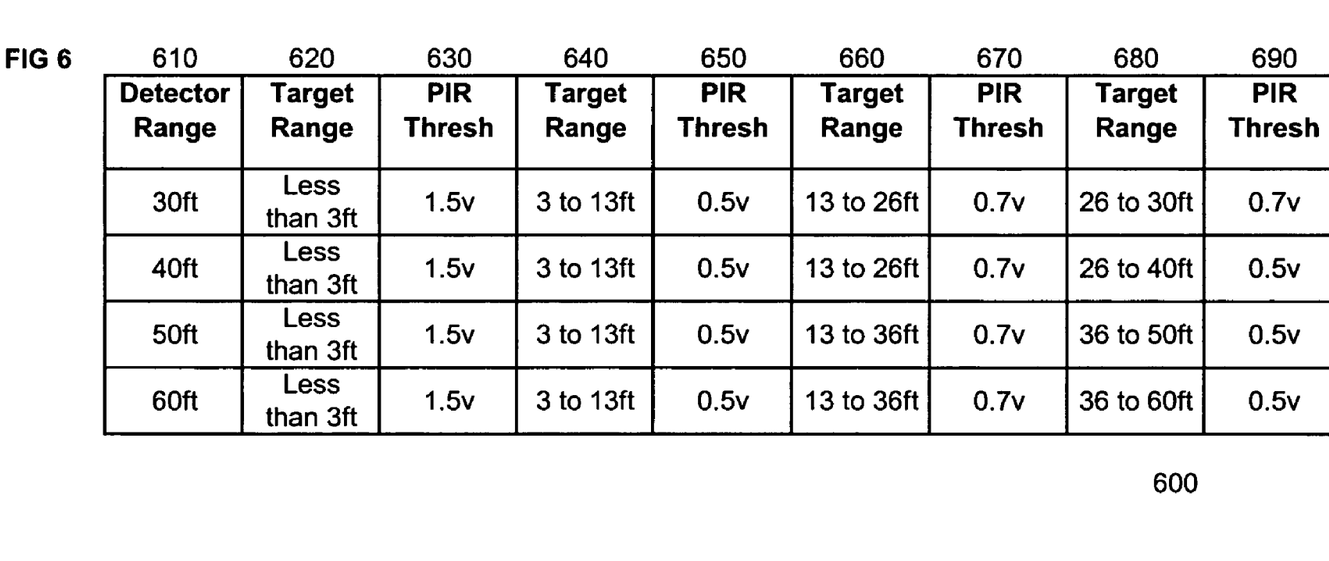
FIG. 6 is a table illustrating PIR thresholds for selected target ranges in accordance with an embodiment of the invention.

Multiple implementations may be executed in accordance with embodiments of the invention. In one preferred embodiment of the invention, PIR pulse thresholds are adjusted dynamically based upon the target range as determined by the Ranging MW. Actual threshold values are largely dependent on optical and circuit gain. FIGS. 6 and 7 illustrate exemplary threshold values that may be implemented in accordance with an embodiment of the invention.

FIG. 6 illustrates a table 600 that includes multiple detector ranges 610. A PIR threshold 630 is provided for each insect bin target 620. A PIR threshold 650 is provided for each short range bin target 640. A PIR threshold 670 is provided for each mid-range bin target 660 and a PIR threshold 690 is provided for each long range bin target 680. As illustrated, the thresholds generally increase as the target range decreases, with the exception of the threshold in the 3 to 13 ft target range, which is reduced to increase PIR sensitivity in the vicinity beneath the detector for crawl detect. If detection of crawling intruders in this area is not required, or if PIR sensitivity in this area is increased, this threshold can be increased accordingly, perhaps to 1 volt. In order to minimize the chances of the PIR technology detecting insects near the detector, the PIR technology may be disabled or greatly reduced in sensitivity when the insect range bin detects a target. As illustrated in FIG. 6, PIR sensitivity can be reduced by requiring larger amplitude or a greater quantity or frequency of pulses to be required for consideration as a PIR alarm.

Figure 7A:
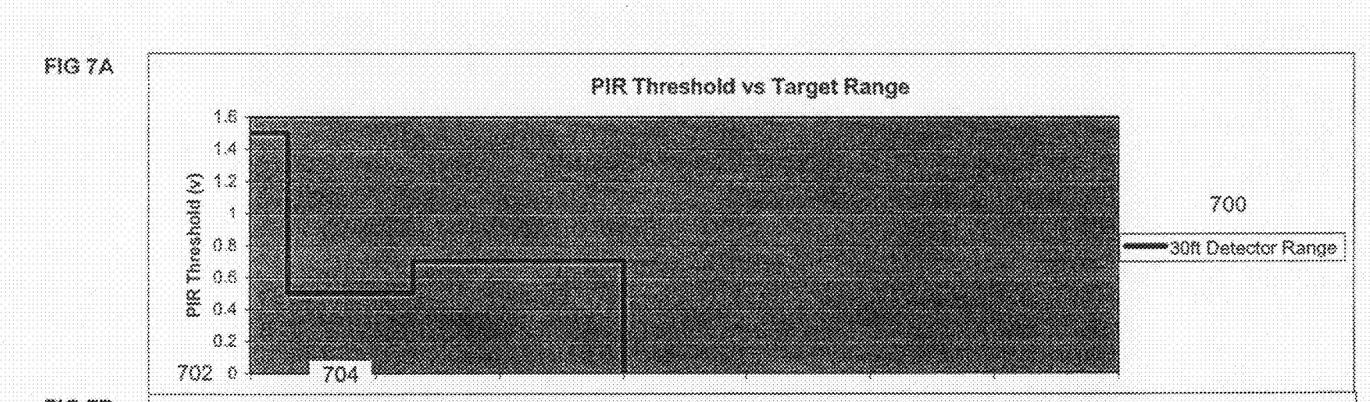
FIG. 7A is a graph illustrating PIR threshold vs. target range for a first detector range in accordance with an embodiment of the invention.
Figure 7B:
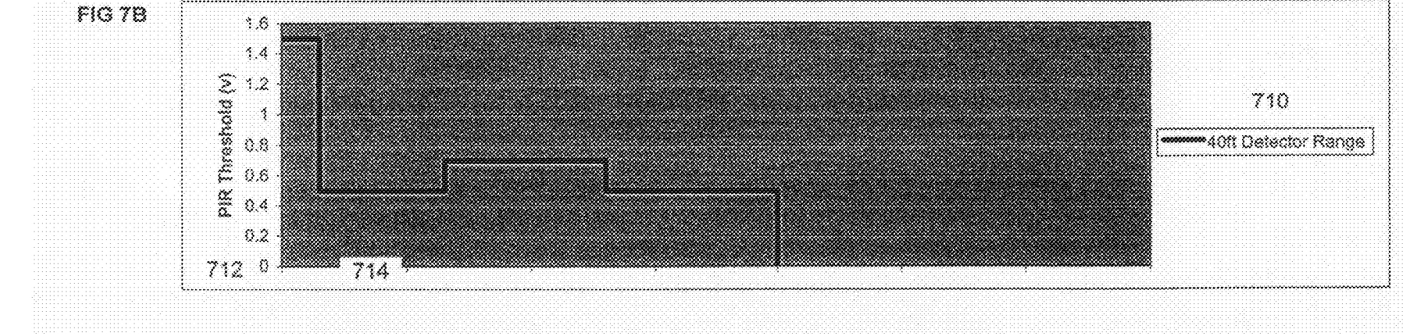
FIG. 7B is a graph illustrating PIR threshold vs. target range for a second detector range in accordance with an embodiment of the invention.
Figure 7C:
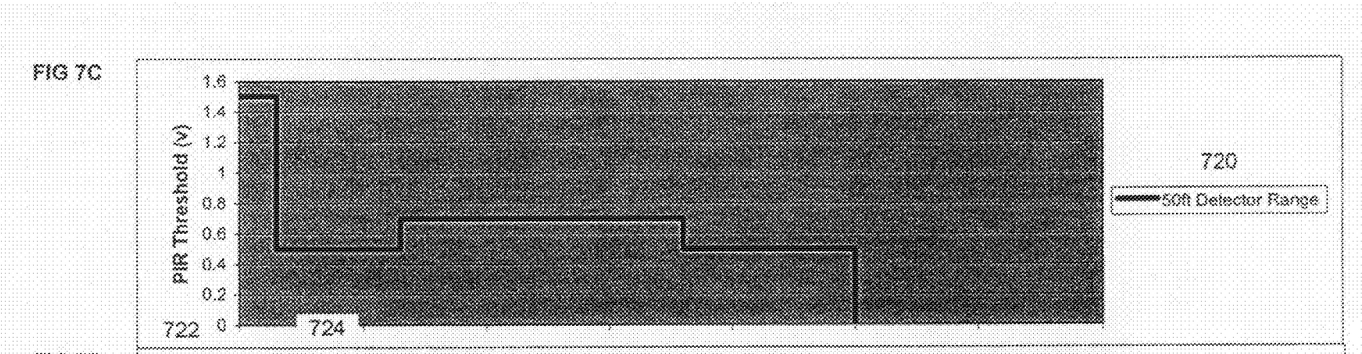
FIG. 7C is a graph illustrating PIR threshold vs. target range for a third detector range in accordance with an embodiment of the invention.
Figure 7D:
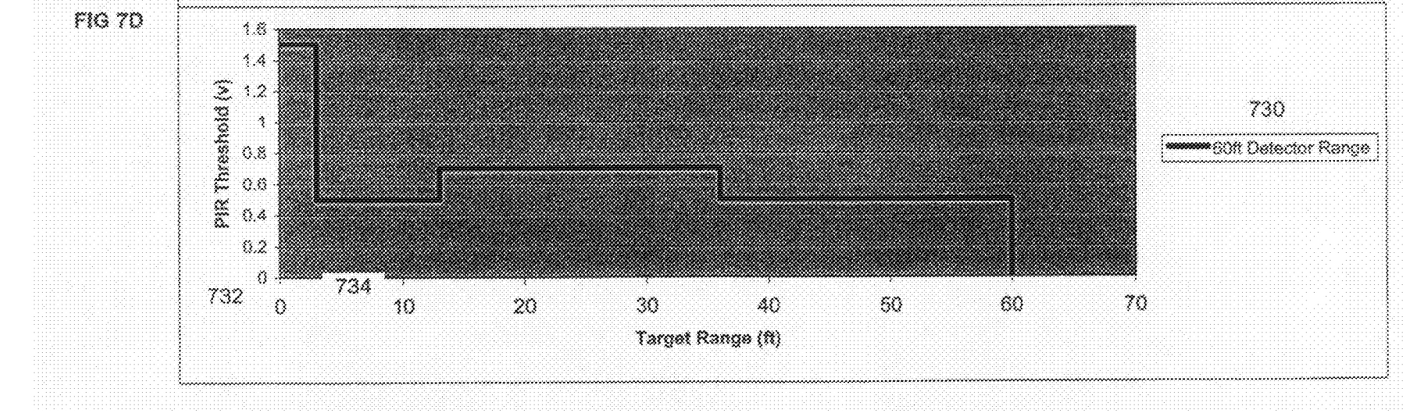
FIG. 7D is a graph illustrating PIR threshold vs. target range for a fourth detector range in accordance with an embodiment of the invention.

FIGS. 7A-7D are timing diagrams illustrating PIR threshold vs. target range in accordance with an embodiment of the invention. FIG. 7A illustrates a graph 700 for detection within a 30 ft detector range. Along an x-axis 704, the target range is shown and along a y-axis 702, a PIR threshold is shown. Similarly, in FIG. 7B, a graph 710 is shown for detection within a 40 ft detector range. Along an x-axis 714, the target range is shown and along a y-axis 712, a PIR threshold is shown. In FIG. 7C, a graph 720 is shown for detection within a 50 ft detector range. Along an x-axis 724, the target range is shown and along a y-axis 722, a PIR threshold is shown. Similarly, in FIG. 7D, a graph 730 is shown for detection within a 60 ft detector range. Along an x-axis 734, the target range is shown and along a y-axis 732, a PIR threshold is shown. As illustrated in all of FIGS. 7A-7D, a PIR threshold is adjusted to be high in regions near the detector and in the mid range where the PIR detection sensitivity is high, and lower in more distant regions and in close regions where the PIR detection sensitivity is lower. If the PIR detection sensitivity is higher in these regions, the thresholds could be increased accordingly.

Embodiments of the invention utilize a Doppler microwave system capable of detecting an object range and adjusting the sensitivity of the PIR detector to account for object range. Embodiments of the invention utilize multiple range limited MW stages configured for different ranges to determine the general range of the moving object. Based on signal levels present on these MW stages, an approximate object range is determined. The sensitivity of the PIR is then adjusted based on a PIR sensitivity vs. object range function that is optimized to alarm on humans and ignore small animals and insects.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A system for improving false alarm immunity for a dual intrusion detector, the dual intrusion detector including at least one microwave sensor and at least one passive infrared sensor, the system comprising:
    multiple range bins for classifying microwave signals, the multiple range bins comprising at least a long range bin and a mid range bin;
    a range determination, module for estimating a target range based on a state of each of the multiple range bins; and
    an infrared sensitivity determination mechanism for determining an optimal infrared sensor sensitivity level based on the estimated target range, wherein a target located within the long range bin and not within the mid range bin, and that transmits a signal having a frequency below a predetermined threshold, triggers an increase in infrared detector sensitivity level in order to detect slow moving intruders.

2. The system of claim 1, further comprising dynamically adjusting an infrared sensitivity level to a predetermined threshold upon determination of the target range.

3. The system of claim 1, further comprising an alarm selection component for determining whether to trigger an alarm based on microwave sensor and passive infrared sensor output.

4. The system of claim 1, wherein the multiple range bins further comprise a short range bin.

5. The system of claim 4, wherein the multiple range bins further comprise an insect range bin.

6. The system of claim 5, wherein the insect range bin is capable of detecting insects in an immediate vicinity of the intrusion detector.

7. The system of claim 5, wherein a target within the short range bin and not within the insect range bin triggers an increase in an infrared detector sensitivity level to facilitate detection of crawling intruders.

8. The system of claim 4, wherein the short range bin detects crawling intruders under or in the vicinity of the intrusion detector.

9. A system for improving false alarm immunity for a dual intrusion detector, the dual intrusion detector including at least one microwave sensor and at least one passive infrared sensor, the system comprising:
    multiple range bins for classifying microwave signals, the multiple range bins including a long range bin, a mid range bin, a short range bin, and an insect range bin capable of detecting insects in an immediate vicinity of the intrusion detector;
    a range determination module for estimating a target range based on a state of each of the multiple range bins; and
    an infrared sensitivity determination mechanism for determining an optimal infrared sensor sensitivity level based on the estimated target range, wherein when the insect bin detects a target, the infrared sensitivity determination mechanism determines that the optimal infrared sensor sensitivity is a low sensitivity and an infrared alarm trigger requires high amplitude pulses.

10. The system of claim 9, wherein a target located within the long range bin and not within the mid range bin, and that transmits a signal having a frequency below a predetermined threshold, triggers an increase in infrared detector sensitivity level in order to detect slow moving intruders.

11. The system of claim 9, wherein when the insect range bin detects a target, the infrared sensitivity determination mechanism triggers a time delay, beginning at insect range bin target detection, and terminating at a fixed time after clearance of the insect range bin, wherein infrared signals are ignored during the time delay.

12. A system for improving false alarm immunity for a dual intrusion detector, the dual intrusion detector including at least one microwave sensor and at least one passive infrared sensor, the system comprising:
  multiple range bins for classifying microwave signals, the multiple range bins including a long range bin, a mid range bin, a short range bin, and an insect range bin capable of detecting insects in an immediate vicinity of the intrusion detector;
  a range determination module for estimating a target range based on a state of each of the multiple range bins; and
  an infrared sensitivity determination mechanism for determining an optimal infrared sensor sensitivity level based on the estimated target range, wherein when the insect range bin detects a target, the infrared sensitivity determination mechanism triggers a time delay, beginning at insect range bin target detection, and terminating at a fixed time after clearance of the insect range bin, wherein infrared signals are ignored during the time delay.

13. The system of claim 12, wherein a target located within the long range bin cannot within the mid range bin, and that transmits a signal having a frequency below a predetermined threshold, triggers an increase in infrared detector sensitivity level in order to detect slow moving intruders.

14. A method for minimizing false alarms due to small animals and insects in a coverage area of a dual detector system, the dual detector system including at least one microwave sensing system and at least one passive infrared sensing system, the method comprising:
  determining a target range for a detected target from received microwave signals by providing multiple range bins for the microwave sensing system including an insect range bin capable of detecting insects in an immediate vicinity of the intrusion detector;
  adjusting a passive infrared sensor threshold based on the determined target range, wherein the passive infrared sensor threshold is at a first level when the detected target is a short range target and second level when the target is a longer range target, such that the first level may be higher or lower than the second level depending on PIR sensitivity in a short range and a long range; and
  adjusting the passive infrared sensitivity to a low sensitivity when the insect range bin detects intrusion, such that an infrared alarm trigger requires high amplitude pulses.

15. The method of claim 14, further comprising dynamically adjusting an infrared sensitivity level to a predetermined threshold upon determination of the target range.

16. The method of claim 15, further comprising determining whether to trigger an alarm based on output from the Microwave sensing system and the passive infrared sensing system.

17. The method of claim 14, further comprising, when the insect range bin detects a target, triggering a time delay, beginning at insect range bin target detection, and terminating at a fixed time after clearance of the insect range bin, wherein infrared signals are ignored during the time delay.

18. The method of claim 14, further comprising providing a short range bin for detection of crawling intruders under or in the near vicinity of the intrusion detector.

19. The method of claim 14, further comprising providing a long range bin and a mid range bin such that targets detected within the long range bin and not within the mid range bin, and transmitting a signal having a frequency below a predetermined threshold, trigger an increase in infrared detector sensitivity in order to detect slow moving intruders.

20. A method for minimizing false alarms due to small animals and insects in a coverage area of a dual detector system, the dual detector system including at least one microwave sensing system and at least one passive infrared sensing system, the method comprising:
  determining a target range for a detected target from received microwave signals by providing multiple range bins for the microwave sensing system including an insect range bin capable of detecting insects in an immediate vicinity of the intrusion detector and a short range bin for detection of crawling intruders under or in the near vicinity of the intrusion detector;
  adjusting a passive infrared sensor threshold based on the determined target range, wherein the passive infrared sensor threshold is at a first level when the detected target is a short range target and second level when the target is a longer range target, such that the first level may be higher or lower than the second level depending on PIR sensitivity in a short range and a long range; and
  triggering an increase in infrared sensitivity upon detection of a target within the short range bin and not within the insect range bin to facilitate detection of crawling intruders.

21. The method of claim 20, further comprising adjusting the passive infrared sensitivity to a low sensitivity when the insect range bin detects intrusion, such that an infrared alarm trigger requires high amplitude pulses.

22. A method for improving false alarm immunity for a dual intrusion detector, the dual intrusion detector including at least one microwave sensor and at least one passive infrared sensor, the method comprising:
  classifying a received microwave signal into a range bin;
  estimating a target range based on a range bin state comparison;
  determining an optimal passive infrared sensor sensitivity level based on the estimated target range; and
  providing an insect range bin capable of detecting insects in an immediate vicinity of the intrusion detector, and when the insect range bin detects a target, triggering a time delay, beginning at insect range bin target detection, and terminating at a fixed time after clearance of the insect range bin, wherein infrared signals are ignored during the time delay.

23. The method of claim 22, further comprising dynamically adjusting a passive infrared sensitivity level to a predetermined threshold upon determination of the target range.

24. The method of claim 22, further comprising determining whether to trigger an alarm based on the state of the microwave sensor and the passive infrared sensor.

25. The method of claim 22, further comprising adjusting a passive infrared sensitivity level to a low sensitivity level when the insect range bin detects intrusion, such that an infrared alarm trigger requires high amplitude pulses.

26. The method of claim 22, further comprising providing a short range bin for detection of crawling intruders under or in the near vicinity of the intrusion detector.

27. The method of claim 26, further comprising triggering an increase in a passive infrared sensitivity level upon detection of a target within the short range bin and not within the insect range bin.

28. A method for improving false alarm immunity for a dual intrusion detector, the dual intrusion detector including at least one microwave sensor and at least one passive infrared sensor, the method comprising:

classifying a received microwave signal into a range bin;

estimating a target range based on a range bin state comparison;

determining an optimal passive infrared sensor sensitivity level based on the estimated target range; and providing a long range bin and a mid range bin such that targets detected within the long range bin and not within the mid range bin, and transmitting a signal having a frequency below a predetermined threshold, trigger an increase in a passive infrared sensitivity level in order to detect slow moving intruders.

29. The method of claim 28, further comprising providing an insect range bin capable of detecting insects in an immediate vicinity of the intrusion detector.

30. The method of claim 28, further comprising, when the insect range bin detects a target, triggering a time delay, beginning at insect range bin target detection, and terminating at a fixed time after clearance of the insect range bin, wherein infrared signals are ignored during the time delay.

* * * * *